US009992691B2

(12) United States Patent
Stanescu et al.

(10) Patent No.: US 9,992,691 B2
(45) Date of Patent: Jun. 5, 2018

(54) SYSTEMS AND METHODS FOR MANAGING HIGH NETWORK DATA RATES

(71) Applicant: FREESCALE SEMICONDUCTOR, INC., Austin, TX (US)

(72) Inventors: Razvan-Tudor Stanescu, Bucharest (RO); Sorin Alexandru Bora, Craiova (RO); George-Lucian Capraru, com Chiajna (RO)

(73) Assignee: NXP USA, INC., Austin, TX (US)

( * ) Notice: Subject to any disclaimer, the term of this patent is extended or adjusted under 35 U.S.C. 154(b) by 169 days.

(21) Appl. No.: 15/043,653

(22) Filed: Mar. 4, 2016

(65) Prior Publication Data

US 2017/0127297 A1    May 4, 2017

(30) Foreign Application Priority Data

Nov. 3, 2015 (RO) ................. A201500788

(51) Int. Cl.
| | | |
|---|---|---|
| H04Q 7/00 | (2006.01) |
| H04W 24/02 | (2009.01) |
| H04L 5/00 | (2006.01) |
| H04L 12/26 | (2006.01) |
| H04W 28/14 | (2009.01) |
| H04L 1/16 | (2006.01) |
| H04L 1/18 | (2006.01) |
| H04L 29/08 | (2006.01) |
| H04W 28/22 | (2009.01) |
| H04W 84/12 | (2009.01) |

(52) U.S. Cl.
CPC .......... *H04W 24/02* (2013.01); *H04L 1/1671* (2013.01); *H04L 1/1835* (2013.01); *H04L 5/0055* (2013.01); *H04L 43/16* (2013.01); *H04W 28/14* (2013.01); *H04L 69/323* (2013.01); *H04L 69/324* (2013.01); *H04W 28/22* (2013.01); *H04W 84/12* (2013.01)

(58) Field of Classification Search
CPC ..... H04W 24/02; H04W 28/14; H04W 84/12; H04W 28/22; H04L 1/1835; H04L 1/1671; H04L 5/0055; H04L 43/16; H04L 69/324; H04L 69/323
USPC ........................................ 370/328, 329, 330
See application file for complete search history.

(56) References Cited

U.S. PATENT DOCUMENTS

| | | | |
|---|---|---|---|
| 6,463,096 B1 | 10/2002 | Raleigh et al. | |
| 2003/0003905 A1 | 1/2003 | Shvodian | |
| 2010/0226250 A1* | 9/2010 | Plamondon ............. | H04L 47/10 370/230 |
| 2011/0205961 A1* | 8/2011 | Santivanez ....... | H04W 74/0816 370/328 |

(Continued)

FOREIGN PATENT DOCUMENTS

WO    2009061559 A1    5/2009

OTHER PUBLICATIONS

IEEE Standard for Local and Metropolitan Area Networks, Part 15.4, Published Apr. 16, 2012, 209 pages.

*Primary Examiner* — Chuong T Ho (57) ABSTRACT

A wireless communication device includes a physical (PHY) layer module, a media access control (MAC) layer module (102) coupled to the PHY layer module. The MAC layer module is configured to generate a limited acknowledgement (LACK) response that indicates successful receipt of a data transmission, and to reduce a data rate used to transmit data to the wireless communication device.

18 Claims, 9 Drawing Sheets

(56) References Cited

U.S. PATENT DOCUMENTS

| | | |
|---|---|---|
| 2013/0028088 A1 | 1/2013 | Do et al. |
| 2014/0140273 A1* | 5/2014 | Kim ...................... H04L 1/1812 370/328 |
| 2016/0041902 A1* | 2/2016 | Atkisson ............... G06F 11/108 711/103 |
| 2016/0183252 A1* | 6/2016 | Merlin .............. H04W 72/0413 370/336 |

* cited by examiner

MAC DISCOVERY COMMAND FRAMES:

| MAC COMMAND FRAME IDENTIFIERS | | ~402 |
|---|---|---|
| COMMAND FRAME IDENTIFIER | COMMAND NAME | |
| 0x0A | DISCOVERY REQUEST | |
| 0x0B | DISCOVERY RESPONSE | |

| DISCOVERY REQUEST COMMAND FORMAT | | ~404 |
|---|---|---|
| COMMAND FRAME IDENTIFIER (SEE TABLE 402) | SUPPORTED PHY DATA RATES | |

| DISCOVERY RESPONSE COMMAND FORMAT | | ~406 |
|---|---|---|
| COMMAND FRAME IDENTIFIER (SEE TABLE 402) | SUPPORTED PHY DATA RATES | |

FIG. 4

NEIGHBOR TABLE EXAMPLE: ~310

| DEVICE ADDRESS | DEVICE ADDRESSING MODE | DEVICE PAN ID | SUPPORTED PHY DATA RATES | LAST PHY DATA RATE USED | LACK COUNTER |
|---|---|---|---|---|---|
| 0x0000000000000001 | 0x03 | 0xAAAA | 0x07 | 0x04 | 0x00 |
| ... | ... | ... | ... | ... | ... |

SYSTEMS AND METHODS FOR MANAGING HIGH NETWORK DATA RATES

BACKGROUND

Field

The present invention is directed in general to wireless communication systems. In one aspect, the present invention relates to a method and system for transferring data at different rates over wireless communication protocol.

Description of the Related Art

Wireless communication devices used to form a wireless personal area network (WPAN) often have limited power sources and signaling infrastructure. These design limitations present significant challenges in terms of data transfer capabilities and power consumption during operation for extended periods of time. Consequently, various protocols have been developed to implement WPANs using small, power-efficient, inexpensive communication devices. For example, IEEE Standard 802.15.4 is a standard which specifies the physical layer and medium access control for low-data-rate, low-power wireless personal area networks in which very low cost wireless communications to nearby devices are provided with little to no underlying infrastructure and limited power consumption.

IEEE 802.15.4 defines a standard for Wireless Personal Area Networks (WPAN) including 2.4 GHz Offset-Quadrature Phase Shift Keying (O-QPSK) Direct Sequence Spread Spectrum (DSSS) devices with a physical (PHY) layer mode that provides a bit rate of 250 kbps and a packet payload of up to 127 bytes. This bitrate and payload can be limiting when using advanced wireless protocol stacks, such as 802.15.4e, however. From a network perspective, two main limitations of the legacy IEEE 802.15.4 PHY devices are (1) low throughput at the PHY layer, which translates into low throughput at NWK layer, and (2) small PHY service data unit (PSDU) size, which requires fragmentation at the upper layers. Advanced PHY modes for stack layers offer advantages including higher throughput, eliminating or reducing packet fragmentation, and creating dedicated links in the network topology for more efficient routing while maintaining backward compatibility with legacy versions of the 802.15.4 standards. Accordingly, it is desirable to provide a wireless communication protocol that enables advanced devices to take advantage of faster data rates and larger frame sizes while still allowing legacy devices to operate in the same network.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

A wireless communication system and methodology are described that allow higher data rates in devices that use advanced versions of the 802.15.4 standard while remaining compatible with previous versions of the 802.15.4 standard. A capabilities discovery mechanism is used to populate an existing neighbor table with the PHY modes being supported. The discovery mechanism allows higher data rates to be used with devices that implement advanced versions of the standard while allowing lower data rates to be used for devices that use older versions of the standard. A recovery mechanism is also provided to allow the data rate to be changed if a higher data rate becomes a burden on the capabilities of a network node with memory constraints.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
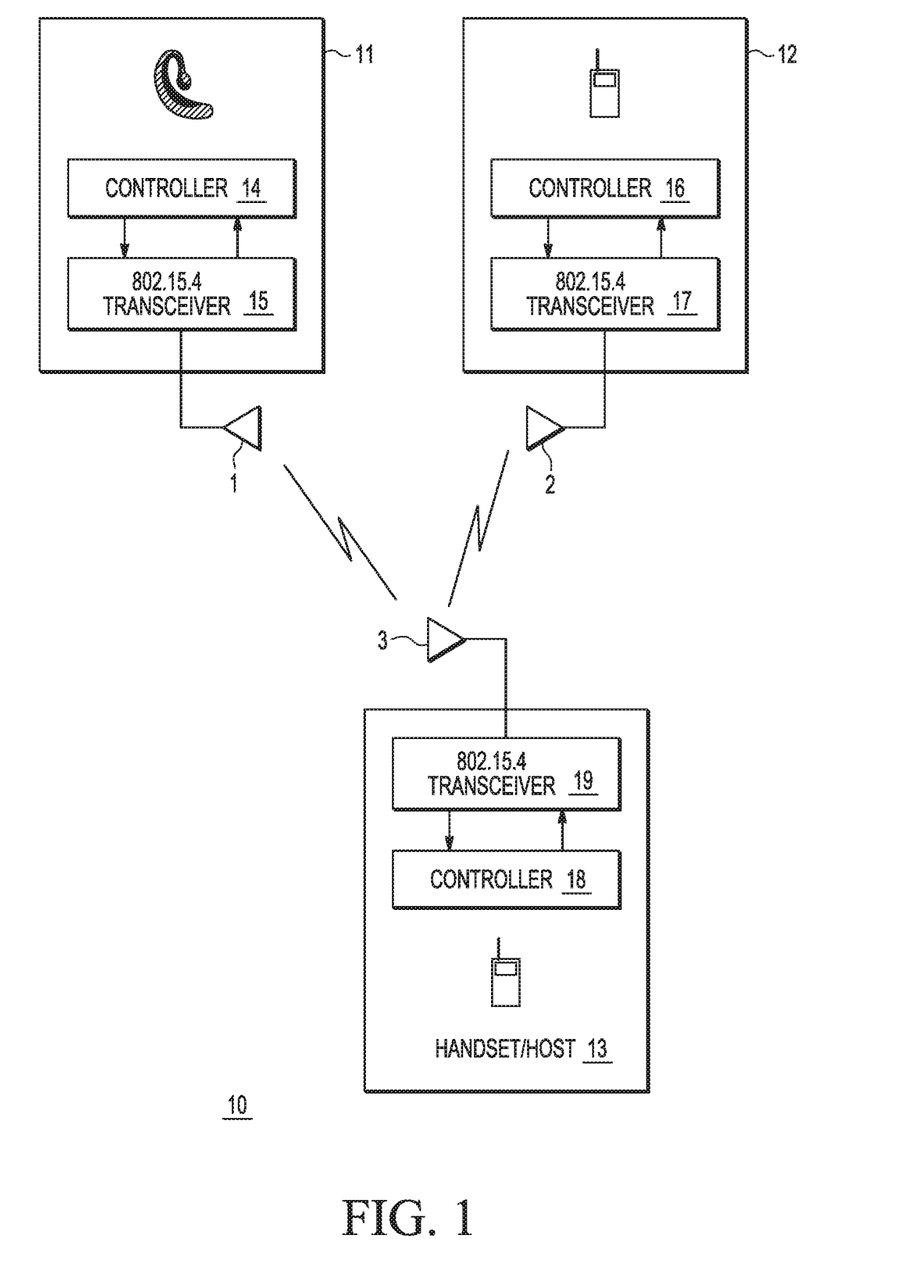
FIG. 1 is a schematic block diagram of an example wireless communication system in which selected embodiments of the present invention may be implemented.

FIG. 1 illustrates a schematic block diagram of an example wireless communication system 10 in which selected embodiments of the present invention may be implemented. As illustrated, the wireless communication system 10 includes a plurality of transmitting/receiving devices 11-13 in the form of stationary or mobile devices that wirelessly exchange information by means of radio signals. The transmitting/receiving devices 11-13 may be portable or cellular phones or handsets, wireless headsets, wireless physiological sensors, wireless computer peripherals, wireless home automation and the like, and may communicate with one another using a predetermined wireless communication protocol, such as a version of the 802.15.4 protocol that supports dynamically adjusting data rate for each device. When implemented as a WPAN, one of the transmitting/receiving devices (e.g., cellular handset 13) may be a full-function device that provides the function of the WPAN coordinator, while the other transmitting/receiving devices (e.g., 11, 12) may be limited function devices, which are associated with the full-function device and can exchange data only with it. When configured as a star-shaped network, it will be appreciated that bidirectional data transmission can occur only between one of the limited function devices at a time and the full-function device, but not between the limited function devices. However, in a peer-to-peer network configuration, the 802.15.4 standard allows every full-function device to communicate with every other full-function device.

Each of the transmitting/receiving devices 11-13 has an associated antenna or antenna array 1-3, respectively, to communicate with the wireless communication devices in its area. In addition, each transmitting/receiving device 11-13 includes an 802.15.4 transceiver unit 15, 17, 19 (respectively) associated with the antenna, and a controller unit 14, 16, 18 (respectively) associated with the transceiver unit for controlling the transmission and reception of data over the antennas. While not shown, each transmitting/receiving device 11-13 may also include a power supply unit (e.g., a battery) and additional components, such as sensors, actuators, etc. When operating in an 802.15.4 network, each transceiver unit 15, 17, 19 can operate under the modulation parameters specified by the PHY layer. As will be appreciated, the PHY layer functionalities can include, for example, the transmitting and receiving of PHY data frames over the physical channel (modulation/demodulation, synchronization, etc.). On the other hand, the MAC layer can provide addressing and channel access control mechanisms that make it possible for several terminals or network nodes to communicate within a multipoint network, such as the acknowledgment of successfully received PHY data frames by acknowledgement (ACK) frames that may or may not include a limit acknowledgement (LACK) indication, increasing a data rate while acknowledging successfully received PHY data frames using ACK frames with or without a LACK indication, handling failed transmission attempts, and use of anti-collision methods such as CSMA-CA (carrier sense multiple access with collision avoidance).

Figure 2:
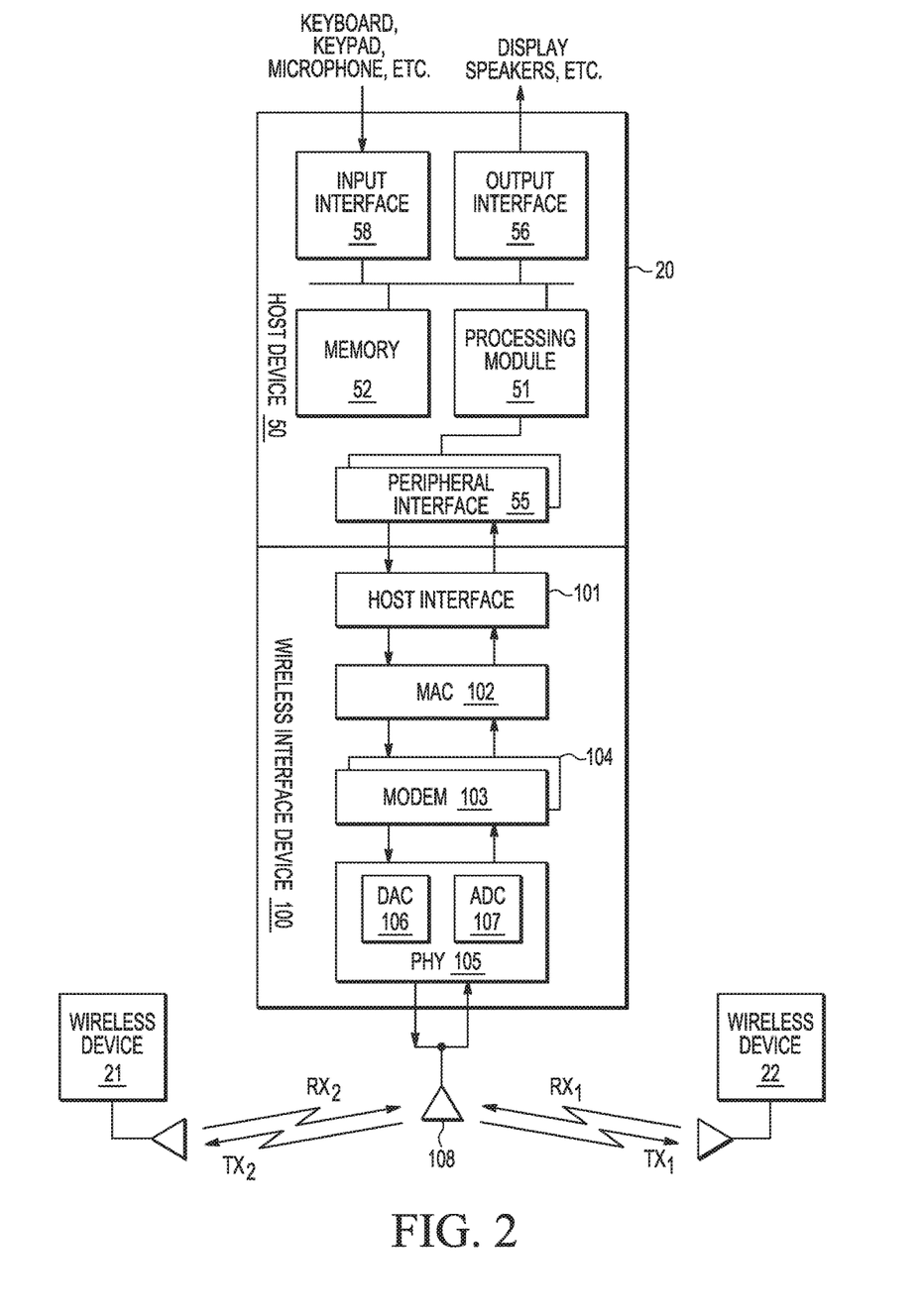
FIG. 2 is a schematic block diagram of a wireless 802.15.4 communication device in accordance with selected embodiments of the present invention.

FIG. 2 is a schematic block diagram illustrating a wireless communication device 20 that may be used as full-function device in an 802.15.4 network of wireless devices 21, 22. As depicted, the wireless communication device 20 includes the host device or module 50 and at least one wireless interface device 100 which may be integrated with or constructed separately from the components of the host device 50. The host device 50 is shown as including a processing module 51, memory 52, peripheral interface 55, input interface 58 and output interface 56, but it will be appreciated that other components and configurations may be used, including but not limited to integrating a high-performance embedded microcontroller with associated program and data memory. However configured, the processing module 51 and memory 52 cooperate to provide the specified host functionality, such as a cell phone function, in which case the processing module 51 performs the corresponding communication functions in accordance with a particular cellular telephone standard. For data received from the wireless interface device 100 (e.g., inbound data), the peripheral interface 55 provides the data to the processing module 51 for further processing and/or routing to the output interface 56. The output interface 56 provides connectivity to an output display device such as a display, monitor, speakers, etc., such that the received data may be displayed. In the other direction, the processing module 51 may receive the outbound data from an input device such as a keyboard, keypad, microphone, etc. via the input interface 58 or generate the data itself. For data received via the input interface 58, the processing module 51 may perform a corresponding host function on the data and/or route it to a wireless interface device 100 via the peripheral interface 55 which provides the data to the wireless interface device 100.

As for the wireless interface device 100, there is provided a host interface 101, a media access control protocol (MAC) layer module 102, separately selectable modem modules 103, 104, a physical layer module (PHY) 105, a digital-to-analog converter (DAC) 106, and an analog-to-digital converter (ADC) 107. Typically, transmit data coming from the host device 50 is presented to the MAC module 102 which, in selected embodiments, provides 802.15.4 compliant hardware support, such as control of packet transmission/reception, security-related encryption, error detection and control, and the like. The MAC layer module 102 presents the transmit data to the baseband modems 103, 104 which modulate the data depending on the selected transmit mode. The baseband modem 103 processes the MAC data by performing spreading and pulse-shaping on the data packet. The data from the selected baseband modem 103, 104 is presented to the PHY layer module 105 which processes the transmit data (encoding, modulation, etc.) and then hands its output to the DAC 106 for conversion to an analog signal if it has not been converted to the analog signal during the modulation process. The modulated analog signal or DAC output may then be multiplied by a gain factor and filtered and passed to the antenna section 108. On the receive side, the antenna section 108 output is passed to the PHY layer module 105 where it is multiplied by a gain factor, filtered and digitized into a digital signal by the ADC 107. The digital signal may be further processed by the PHY layer module 105 into digital representation and passed to the baseband modems 103, 104. The baseband modem 103 demodulates the packet bits, such as by performing an OQPSK or FM demodulation. The demodulated data is passed through the MAC layer module 102 to the host 50 for delivery to the output interface 56. As will be appreciated, one or more of the modules in the wireless interface device 100 may be implemented with dedicated hardware, alone or in combination with a communications processor and an associated memory for storing and executing instructions that control the access to the physical transmission medium in the wireless network.

Figure 3:
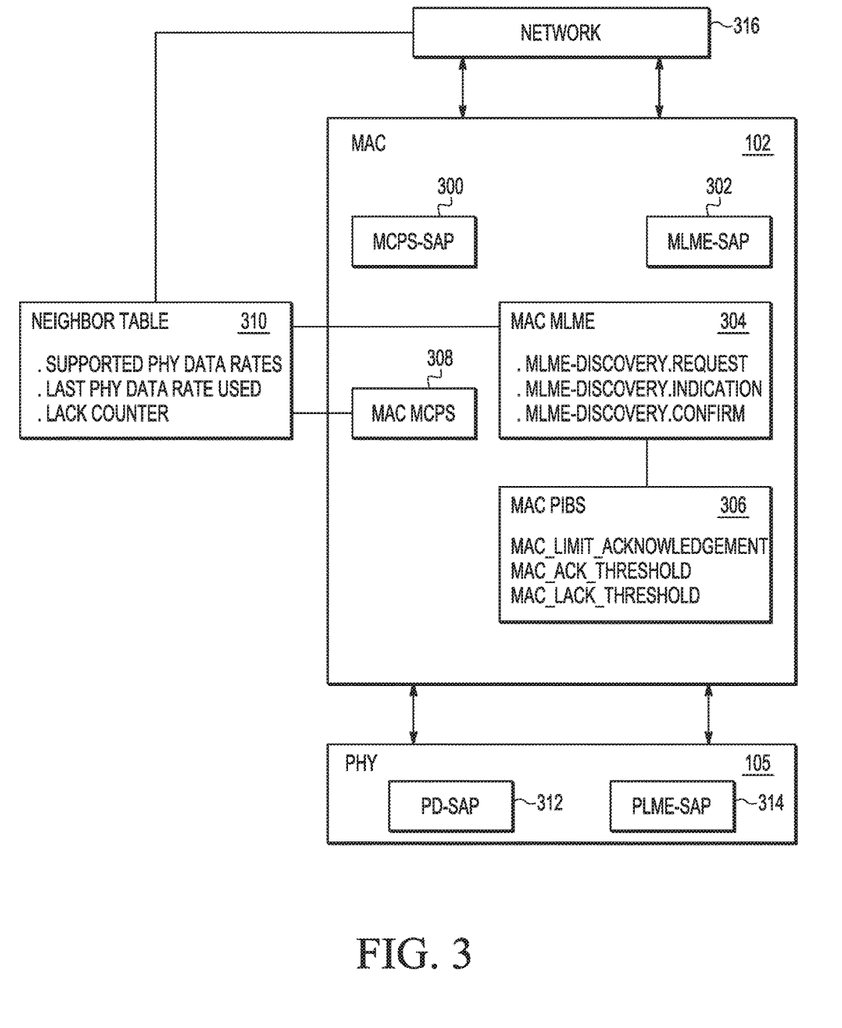
FIG. 3 is a schematic block diagram of components in upper, MAC and PHY layers in accordance with selected embodiments of the present invention.

FIG. 3 is a schematic block diagram of components in MAC and PHY layer modules 102, 105 in accordance with selected embodiments of the present invention. MAC layer module 102 includes MAC common part sublayer service access point (MCPS-SAP) 300, MAC layer management entity service access point (MLME-SAP) 302, MAC layer management entity service MAC MLME 304, MAC personal area network information bases (MAC PIBs) 306, and MAC common part sublayer service (MAC MCPS) 308. PHY layer module 105 includes PHY data SAP (PD-SAP) 312 and physical layer management entity SAP (PLME-SAP) 314. MAC layer module 102 can be coupled to access neighbor table 310 via MCPS 308 and/or MAC MLME 304, to communicate with upper network layer 316 via MCPS-SAP 300 and MLME-SAP 302, and to communicate with PD-SAP 312 and PLME-SAP 314 in PHY layer module 105. Neighbor table 310 is also accessible by network layer 316.

MAC layer module 102 provides an interface between the next higher network layer 316 and PHY layer module 105. MLME 304 provides service interfaces (referred to as "primitives") through which layer management services may be invoked. MLME 304 is also responsible for maintaining a database of managed objects pertaining to the MAC sublayer in MAC PIBs 306. In addition to including relevant primitives and PIB attributes specified in the 802.15.4 standard specification, MAC layer module 102 includes MAC MLME 304 with discovery primitives MLME-DISCOVERY.Request, MLME-DISCOVERY.Indication, and MLME-DISCOVERY.Confirm and MAC PIB attributes 306 including macLimitAcknowledgement, macACKThreshold, and macLACKThreshold. The discovery primitives are used to indicate discovery results to the network layer 316 and allow the network layer 316 to populate neighbor table 310 with the PHY modes supported by each device in the network. For example, the PHY mode can specify frequency, power, modulation format, data rate, and/or other suitable parameters.

The MLME-DISCOVERY.Request primitive can be issued by a wireless communication device to initiate a PHY data-rate discovery process. If a coordinator has been found during a scan process, the MLME-DISCOVERY.Request primitive can be issued in unicast, or broadcast to any node in range for a certain period of time. MAC layer module 102 of the requesting device will send a discovery request command frame with the supported PHY modes so that any receiving node can use them. Examples of parameters that can be used in the MLME-DISCOVERY. Request include:

DestinationAddress (broadcast or unicast)
DestinationAddressMode (16 or 64 bit address)
Destination PAN Id
DiscoveryDuration (if request is broadcast)
SecurityLevel (optional)
KeyIdMode (optional)
KeySource (optional)
KeyIndex (optional).

Other suitable parameters can be used in the MLME-DISCOVERY.Request in addition to or instead of the foregoing parameters.

The MLME-DISCOVERY.Indication primitive can be presented to network layer 316 with the capabilities of the source node whenever an MLME-discovery command or a discovery response command is received. The MLME-DISCOVERY.Indication primitive can be generated based on the value of a macAutoRequest PIB attribute that is managed by network layer 316. In a default mode, the macAutoRequest PIB attribute indicates whether a device automatically sends a data request command if its address is listed in a beacon frame. When using the LACK features, a discovery response command frame is sent whenever a discovery request command frame is received. Examples of parameters that can be used in the MLME-DISCOVERY. Request include:

DeviceAddress
DeviceAddressing Mode
DevicePANId
SupportedPHYDataRates (e.g., a PHY device may support data rates of 250, 500, 1000, and/or 2000 kbps).

Other suitable parameters can be used in the MLME-DISCOVERY.Indication in addition to or instead of the foregoing parameters.

The MLME-DISCOVERY.Confirm primitive can be used by MAC module 102 to indicate the status of the discovery process to network layer 316, i.e., whether a response to the discovery request was successfully received by the requester.

Figure 7:
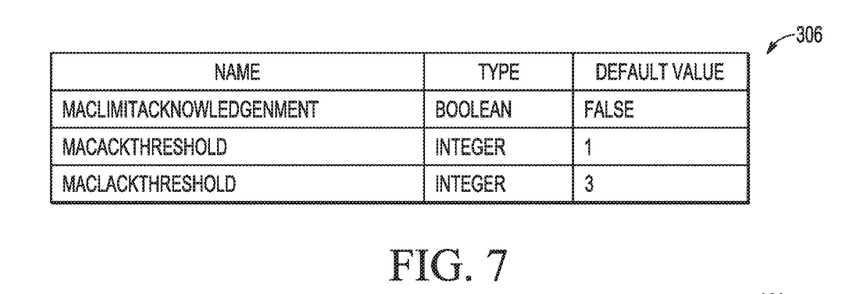
FIG. 7 is a table of additional MAC PIBs that can be used in the MAC layer in accordance with selected embodiments of the present invention.

The MAC PIB attribute macLimitAcknowledgement (LACK) can be sent as a flag in an ACK frame by a node to indicate that data has been successfully received, but that data buffers in the node are reaching capacity. The macLimitAcknowledgement PIB can be set to the MAC layer module 102 by the network layer 316 prior to reaching the limit to allow sender nodes to reduce their data rate before the buffer limit is reached. The LACK can be sent to any data sender, if a frame acknowledgement (ACK) request bit set, in order to ensure proper acknowledgement of packets sent by legacy devices. As shown in FIG. 7, the macLimitAcknowledgement PIB can be a Boolean value that is set to TRUE or FALSE depending whether a reduction in the data rate is being requested. A default value can be set to FALSE.

The PIB attribute macACKThreshold can be used to determine when to indicate that the data rate for sending data to a device should be increased or decreased. For example, a LACK counter can be incremented each time a LACK is received. Once the LACK counter increases to the level of the macACKThreshold, the receiving device can shift to the next lowest data rate when sending data to the node. As shown in FIG. 7, the macACKThreshold PIB can be an integer value that is set as a threshold, which when equal to the LACK counter while the LACK counter is increasing, a shift to the next lower data rate can be made. A default value can be set to one but another suitable value can be used.

The PIB attribute macLACKThreshold can be used to determine when to increase or decrease the data rate for data being sent to a device. For example, the LACK counter can be decremented each time an acknowledgement (ACK) is received. Once the LACK counter decreases to the level of the macLACKThreshold, a signal can be sent to shift to the next highest data rate when sending data to the node, as further described herein. As shown in FIG. 7, the macLACKThreshold PIB can be an integer value that is set as a threshold, which when equal to the LACK counter while the LACK counter is decreasing, the signal to shift to the next higher data rate can be sent. A default value can be set to three but another suitable value can be used.

Figure 4:
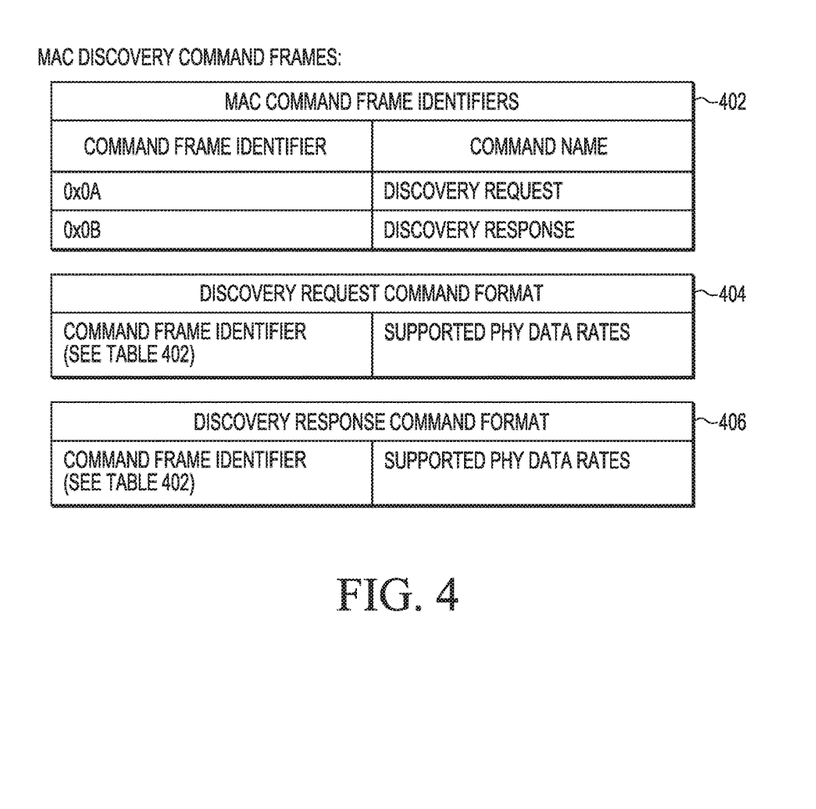
FIG. 4 is a diagram of formats for data frames for MAC discovery commands in accordance with selected embodiments of the present invention.

FIG. 4 is a diagram of formats for data frames 404, 406 for MAC discovery commands (DiscoveryRequest and DiscoveryResponse) shown in table 402 in accordance with selected embodiments of the present invention. The DiscoveryRequest and DiscoveryResponse commands can be identified by respective values such as "0x0A" and "0x0B" as shown for example or by other suitable values.

DiscoveryRequest command format 404 includes MAC header (MHR) fields as specified in section 7.2.2.4 of the 2006 version of the IEEE 802.15.4 Standard such as frame control, sequence number, address, and security header fields. DiscoveryRequest command format 404 further includes a command frame identifier field for the DiscoveryRequest command, which for this example, is shown as "0x0A" in table 402, and a field for the supported PHY data rates.

DiscoveryResponse command format 406 includes MAC header (MHR) fields as specified in section 7.2.2.4 of the 2006 version of the IEEE 802.15.4 Standard such as frame control, sequence number, address, and security header fields. DiscoveryResponse command format 406 further includes a command frame identifier field for the DiscoveryResponse command, which for this example, is shown as "0x0B" in table 402, and a field for the supported PHY data rates.

Figure 5:
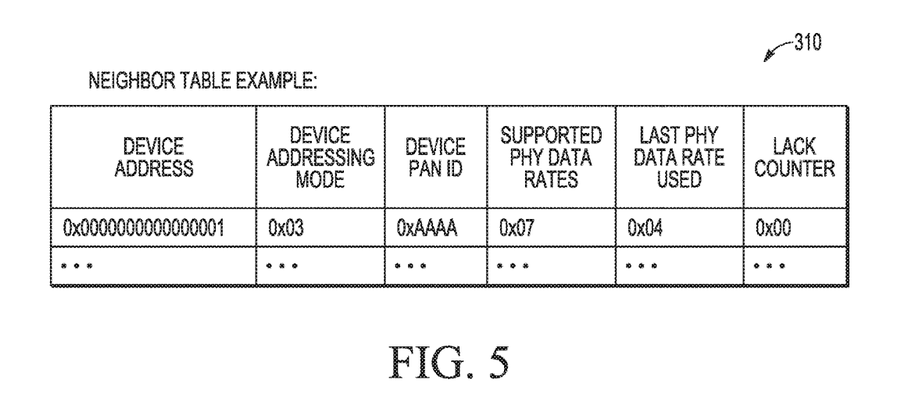
FIG. 5 is a diagram of an example of a neighbor table in accordance with selected embodiments of the present invention.

Referring to FIGS. 3 and 5, FIG. 5 is a diagram of an example of a neighbor table 310 in accordance with selected embodiments of the present invention that includes device address, device addressing mode, device PAN identifier, supported PHY data rates, last PHY data rate used, and LACK counter fields for one or more devices in a wireless network. The supported PHY data rates, last PHY data rate used, and LACK counter fields can be updated by logic in MAC layer 102 or by logic in network layer 316.

Figure 6:
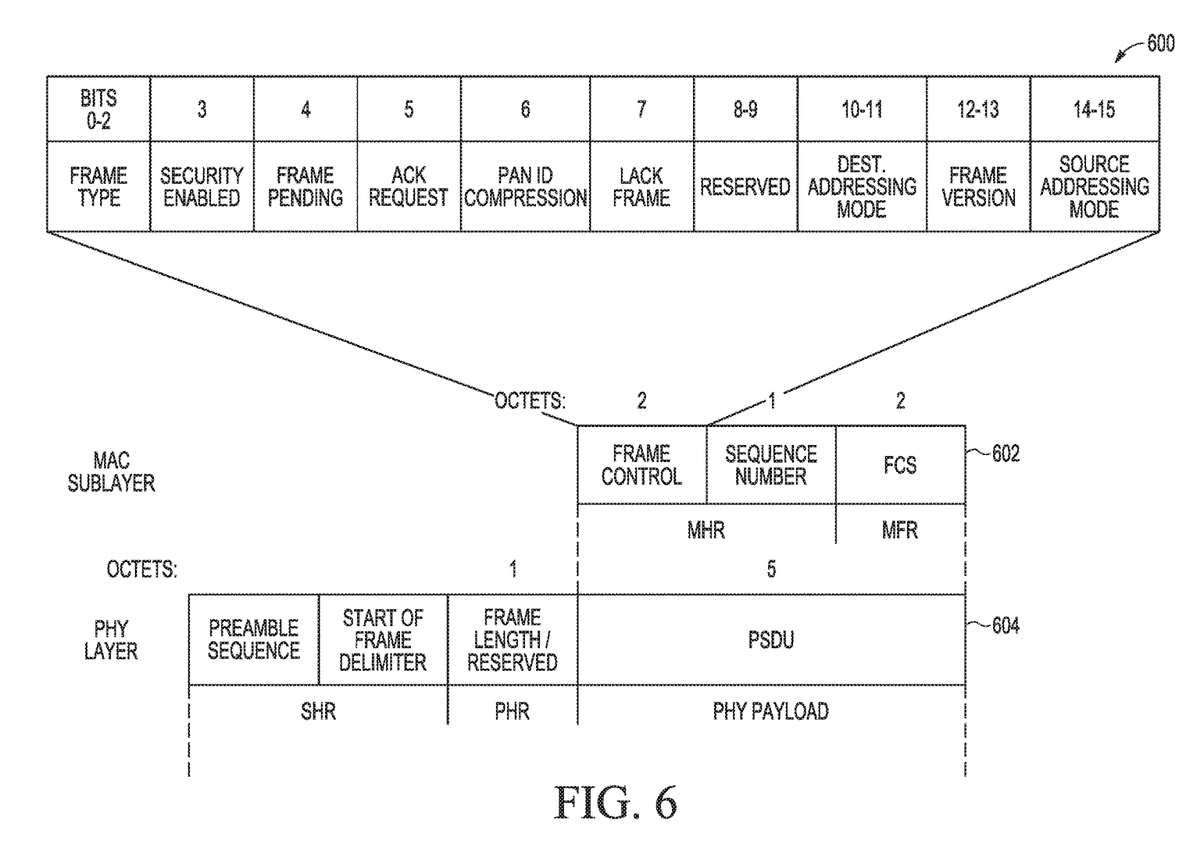
FIG. 6 is a diagram of a LACK frame format in accordance with selected embodiments of the present invention.

FIG. 6 is a diagram of a LACK frame format 600 in accordance with selected embodiments of the present invention that can be included in a frame control field of a MAC header portion of MAC frame 602. LACK frame 600 is two octets in length and includes frame type, security enabled, frame pending, acknowledgement request, PAN identifier compression, reserved, destination addressing mode, frame version, and source addressing mode fields.

The frame type subfield can be 3 bits in length and set to a value that indicates whether the frame is an acknowledgement type or some other type.

The security enabled subfield can be 1 bit in length, and set to a value of one if the frame is protected by the MAC layer 102 or set to zero otherwise.

The frame pending subfield can be 1 bit in length and set to one if the device sending the frame has more data for the recipient, or set to zero otherwise.

The acknowledgment request subfield can be 1 bit in length and can specify whether an acknowledgment is required from the recipient device on receipt of data or MAC command frame. For example, a value of one can indicate that the recipient device is to send an acknowledgment frame if the frame passes a specified level of filtering upon reception. A value of zero can be set to indicate the recipient device is not required to send an acknowledgment frame.

The PAN ID compression subfield can be 1 bit in length and can specify whether the MAC frame is to be sent containing only one of the PAN identifier fields when both source and destination addresses are present. If this subfield is set to one and both the source and destination addresses are present, the frame can contain only the Destination PAN Identifier field, and the Source PAN Identifier field can be assumed equal to that of the destination. If this subfield is set to zero and both the source and destination addresses are present, the frame can contain both the Source PAN Identifier and Destination PAN Identifier fields. If only one of the addresses is present, this subfield can be set to zero, and the frame can contain the PAN identifier field corresponding to the address. If neither address is present, this subfield can be set to zero, and the frame will not contain either PAN identifier field.

The LACK frame subfield can be 1 bit in length and occupy a reserved bit in the frame control field specified in the IEEE 802.15.4 standard. For example, the LACK frame subfield can be set to a value of one to indicate the frame is a limit acknowledgement frame and the frame is an acknowledgement type, then a LACK counter may be incremented. If the LACK frame subfield is not set to one and the frame is an acknowledgement type, then a LACK counter may be decremented. The value of the LACK counter can be used to determine whether the slower data rate needs to be used to communicate with the device sending the acknowledgement frame, as further described herein.

The destination addressing mode subfield can be 2 bits in length and can be set to a value that indicates whether the PAN identifier and address fields are not present, whether the address field contains a 16 bit short address, or whether the address field contains a 64 bit extended address. If this subfield is equal to zero and the frame type subfield does not specify that this frame is an acknowledgment or beacon frame, the source addressing mode subfield can be nonzero, indicating that the frame is directed to a PAN coordinator.

The frame version subfield can be 2 bits in length and can specify the version number of the IEEE 802.15.4 standard corresponding to the frame 600.

The source addressing mode subfield can be 2 bits in length and can be set to a value that indicates whether the PAN identifier and address fields are not present, whether the address field contains a 16 bit short address, or whether the address field contains a 64 bit extended address.

The MAC layer frame 600 is included as a payload portion in a PHY service data unit subfield of PHY layer frame 604. In addition, PHY layer frame 604 can include a synchronization header with a preamble sequence and start of frame delimiter subfields, and a PHY header with a frame length and reserved subfields. Note that the particular embodiment of frame 600 is shown in FIG. 6 as an example and other embodiments can include other subfields as specified by a particular version of a standard communication protocol, such as the IEE 802.15.4 standard or other suitable communication protocol. With the version of frame 600 shown, the LACK frame subfield occupies a reserved bit and can be used in an acknowledgement type frame.

Figure 8:
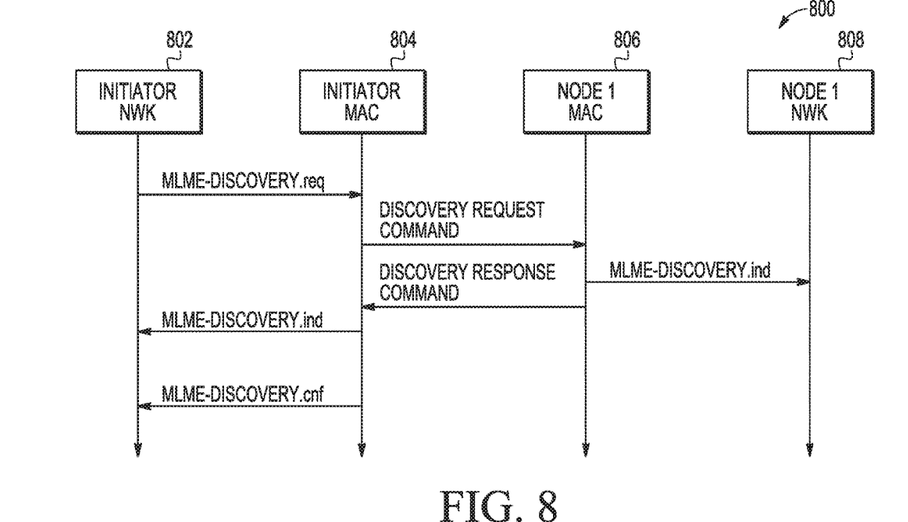
FIG. 8 illustrates a unicast data rate discovery procedure that may be used in a wireless communication system in accordance with selected embodiments of the present invention.

FIG. 8 illustrates a unicast data rate discovery procedure 800 that may be used in a wireless communication system in accordance with selected embodiments of the present invention. Initiator network layer 802 issues a MLME-DISCOVERY request to initiator MAC layer 804. In response, initiator MAC layer 804 sends a DiscoveryRequest command frame with the destination address of node 1. MAC layer 806 then sends an MLME-DISCOVERY indication to the network layer 808 of node 1 and a DiscoveryResponse command to initiator MAC layer 804. Initiator MAC layer 804 sends the MLME-DISCOVERY indication and MLME-DISCOVERY confirm once the discovery duration specified in the request expires. As shown, initiator network layer 802 triggers the discovery process on demand and MAC layers 804, 806 manage sending and receiving frames on participating nodes.

Figure 9:
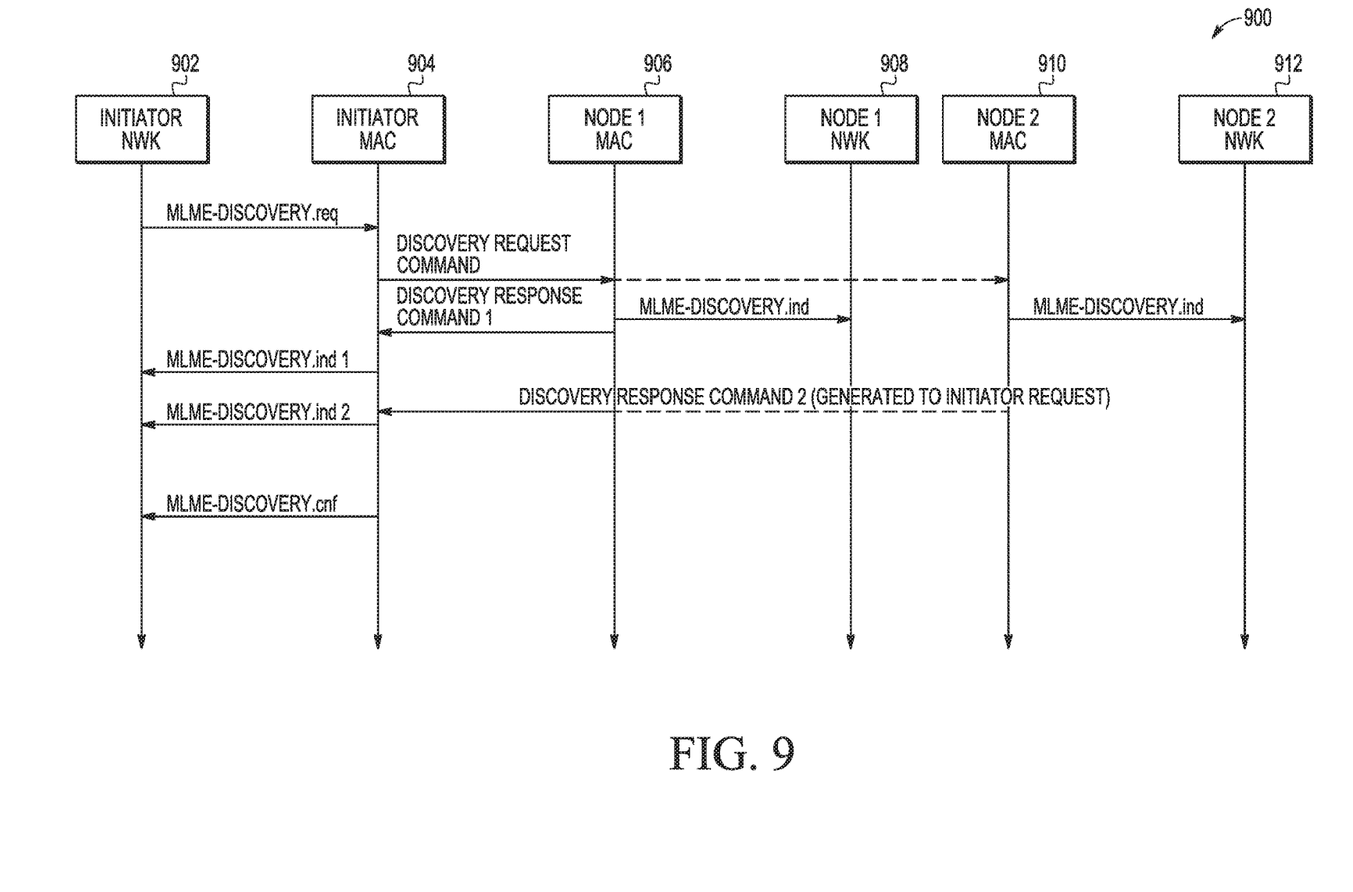
FIG. 9 illustrates a broadcast data rate discovery procedure that may be used in a wireless communication system in accordance with selected embodiments of the present invention.

FIG. 9 illustrates a broadcast data rate discovery procedure 900 that may be used in a wireless communication system in accordance with selected embodiments of the present invention. Initiator network layer 902 issues a MLME-DISCOVERY request to initiator MAC layer 904. In response, initiator MAC layer 904 sends a DiscoveryRequest command with broadcast address for destination address, which in this example includes MAC layer 906 of node 1 and MAC layer 910 of node 2. MAC layer 906 of node 1 sends an MLME-DISCOVERY indication to the NWK layer 908 if the macAutoRequest PIB is set to FALSE, then sends a DiscoveryResponse command to initiator MAC layer 904. MAC layer 910 of node 2 also sends a MLME-DISCOVERY indication to the NWK layer 912 if the macAutoRequest PIB is set to FALSE, then sends a DiscoveryResponse command to initiator MAC layer 904. Initiator MAC layer 904 sends the MLME-DISCOVERY indications for nodes 1 and 2 once the DiscoveryResponse commands from nodes 1 and 2 are received. Once the time allotted for the discovery period expires, initiator MAC node 904 sends a MLME-DISCOVERY confirmation to initiator network layer 902. If the macAutoRequest PIB is set to TRUE, no further DiscoveryResponse commands are accepted in response to the MLME-DISCOVERY request once the MLME-DISCOVERY confirmation is received.

Otherwise, the MAC node 904 will send a MLME-DISCOVERY indication for every DiscoveryResponse command received.

Figure 10:
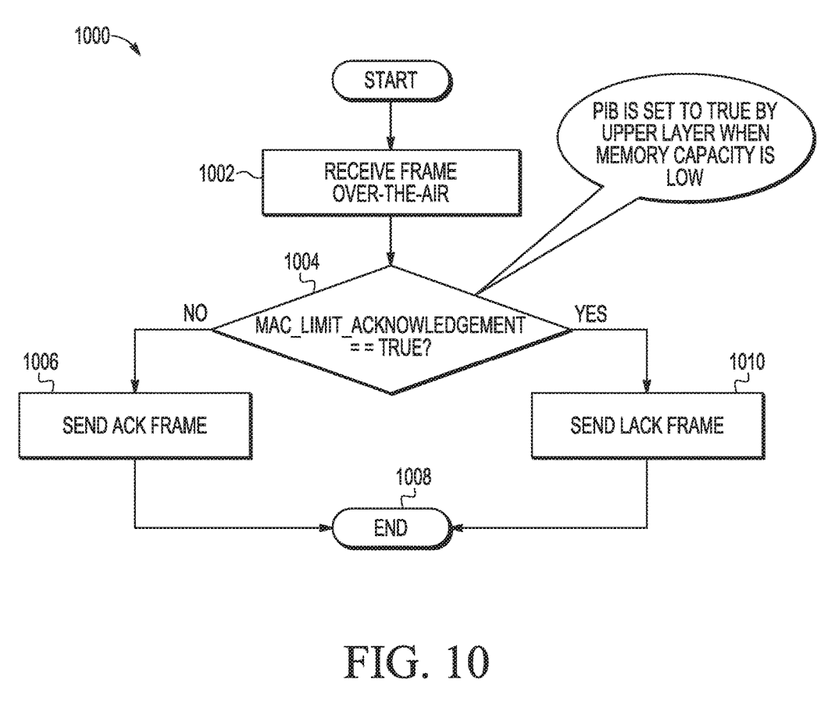
FIG. 10 is a flow diagram of an embodiment of a method for determining whether to use limited acknowledgement or regular acknowledgement frames in a wireless communication device.

FIG. 10 is a flow diagram of an embodiment of a method 1000 for determining whether to use limited acknowledgement or regular acknowledgement frames in a wireless communication device. Some portions of method 1000 may be performed in MAC layer 102 and other portions of method 1000 may be performed by network layer 316. A new frame is received wirelessly or "over-the-air" in process 1002. A macLimitAcknowledement PIB is set true by a network layer when memory capacity for data being received is running low, for example, if fifteen percent or less memory (or other suitable threshold amount of memory) is available. If the macLimitAcknowledgement PIB is determined to be false in process 1004, process 1006 sends an ACK frame in which the LACK indicator in the LACK subfield (as shown, for example, by bit seven in MAC frame 600 of FIG. 6) is not set. If the macLimitAcknowledgement PIB is determined to be true in process 1004, process 1010 sets the LACK subfield in the MAC frame to indicate a LACK frame is being used. Processes 1006 and 1010 both transition to process 1008 to end method 1000. Method 1000 may be repeated each time a frame is received by a node.

Figure 11:
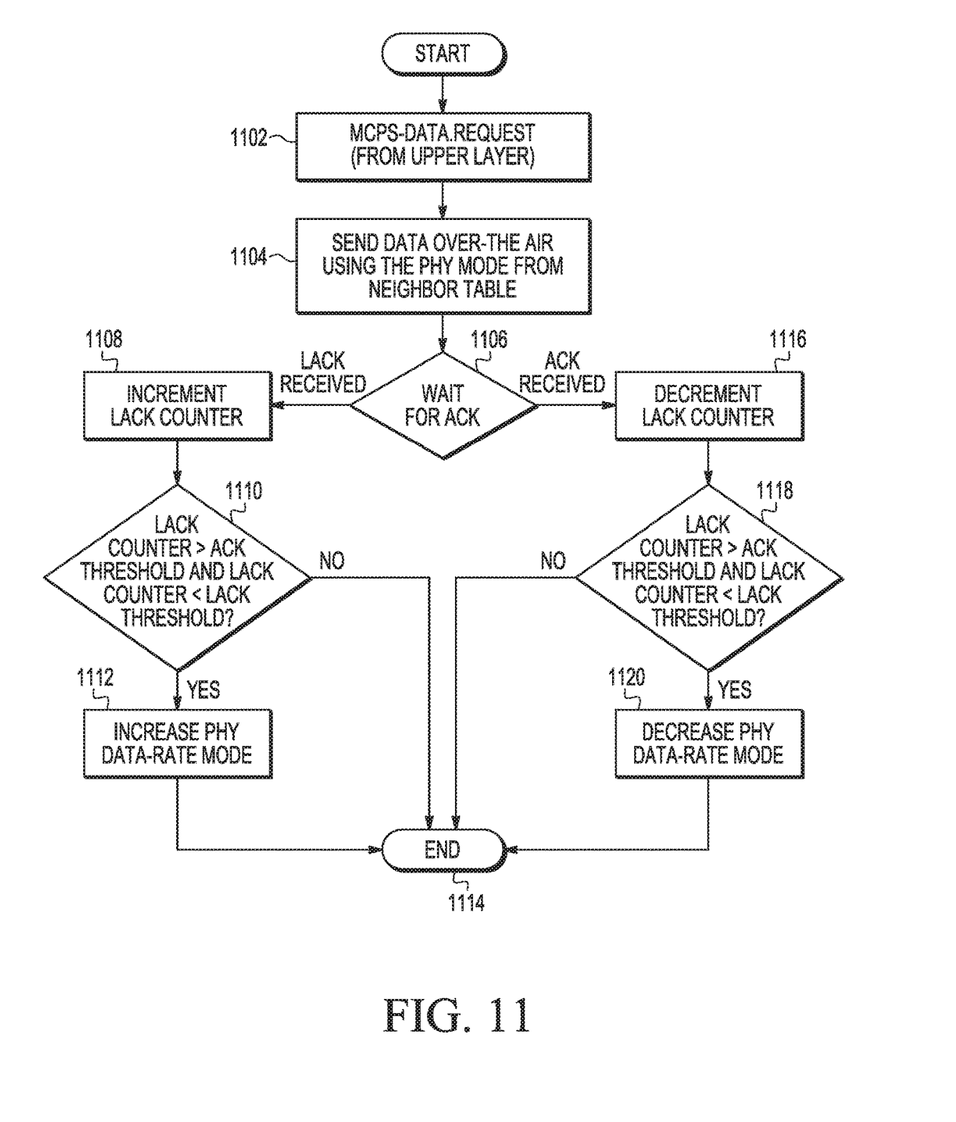
FIG. 11 is a flow diagram of an embodiment of a method for managing data rates in a wireless communication device.

FIG. 11 is a flow diagram of an embodiment of a method 1100 for managing data rates in a wireless communication device. Process 1102 receives a MAC common part sublayer (MCPS) request for data transmission (MCPS-DATA.Request) from a network layer. Process 1104 includes sending the requested data over-the-air using the PHY mode specified for the requesting node in the neighbor table. Process 1106 waits for an acknowledgement frame that the data was received. When the acknowledgement frame is received, process 1106 further determines whether the LACK subfield in the MAC frame is set to indicate that memory capacity for the target node is running low. If so, process 1108 increments a LACK counter. Process 1110 then determines whether the LACK counter is greater than an acknowledgement threshold (e.g., macACKThreshold PIB shown in FIG. 3) and less than a LACK threshold (e.g., macLACKThreshold PIB shown in FIG. 3). If so, process 1112 increases the data rate by changing the PHY mode for the target node. If not, process 1110 transitions to process 1114 to end method 1100.

Returning to process 1106, if the LACK subfield in the MAC frame is not set to indicate that memory capacity for the target node is running low, process 1116 decrements the LACK counter. Process 1118 then determines whether the LACK counter is greater than the acknowledgement threshold and less than the LACK threshold. If so, process 1120 decreases the data rate by changing the PHY mode for the target node. If not, process 1118 transitions to process 1114 to end method 1100. Below the ACK threshold, the highest data rate used, while above the LACK threshold, the lowest data rate is used.

By now it should be appreciated that there has been provided in some embodiments, a wireless communication device that can comprise a physical (PHY) layer module, and a media access control (MAC) layer module (102) coupled to the PHY layer module. The MAC layer module can be configured to generate a limited acknowledgement (LACK) response that indicates successful receipt of a data transmission, and to reduce a data rate used to transmit data to the wireless communication device.

In another aspect, the MAC layer module can be further configured to generate an acknowledgement (ACK) response that indicates successful receipt of a data transmission, and to increase the data rate used to transmit data to the wireless communication device.

In another aspect, the wireless communication device can further comprising a neighbor table that includes data rates supported by the PHY layer module, a last data rate used, and a counter value used to adjust a data rate to be used.

In another aspect, the LACK response can be generated by setting an indicator in an ACK response frame.

In another aspect, the MAC layer module can include a LACK threshold value that indicates the highest data rate to be used.

In another aspect, the MAC layer module can include an ACK threshold value that indicates the lowest data rate to be used.

In another aspect, the first and second threshold values can be implemented in a personal area network information base in the MAC layer module.

In another aspect, the LACK response can be generated when a memory for receiving data is storing a predetermined amount of the data.

In another aspect, the ACK response can be generated when a memory for receiving the data is storing less than the predetermined amount of the data.

In another aspect, the MAC layer module further can include a MAC layer management entity (MLME) that includes a discovery request primitive to determine data rates supported by a target PHY layer module, a discovery indication primitive to indicate the data rates supported by the target PHY layer module, and a discovery confirm primitive to indicate a result of a discovery request.

In another embodiment, a method of managing data rate in a wireless communication device can comprise receiving a request to indicate a PHY mode of the wireless communication device, sending a response indicating the PHY mode of the wireless communication device, and transmitting a limit acknowledgement (LACK) response after receiving a data frame while within a specified threshold of a buffer capacity limit. The LACK response indicates that the data frame was successfully received and that a receiver of the LACK response should send data to the wireless communication device at a lower data rate.

In another aspect, the method can further comprise transmitting an acknowledgement (ACK) response after receiving a data frame when within a specified threshold below a buffer capacity limit, wherein the ACK response indicates that the data frame was successfully received and that a receiver of the ACK response can send data to the wireless communication device at a higher data rate.

In another aspect, the method can further comprise using a reserved bit in an acknowledgement frame of a wireless communication protocol for a personal area network to send the LACK response.

In another aspect, the wireless communication protocol can be an 802.15.4 wireless communication protocol.

In another aspect, the method can further comprise updating a counter when the LACK response or the ACK response is sent. The counter can be related to a data rate to be used when transmitting data to the wireless communication device.

In another aspect, the method can further comprise updating a neighbor table with the PHY mode for the wireless communication device when the PHY mode is received from the wireless communication device.

In another aspect, the PHY mode can indicate a data rate and/or a frame size for the wireless communication device.

In another aspect, the method can further comprise sending a response from an initiator MAC layer module to an initiator network layer module indicating the PHY mode of the wireless communication device, sending a confirm response from a MAC layer module to a network layer module after a specified duration of time expires.

In another aspect, the response indicating the PHY mode of the wireless communication device can include data rates supported by the wireless communication device.

In another aspect, the method can further comprise checking the counter against a LACK threshold and an ACK threshold to determine whether to lower or raise a data rate being used to transmit data to the wireless communication device.

The methods and systems for managing high data rates in advanced nodes while remaining compatible with legacy devices using various versions of the 802.15.4 protocol as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data into high-speed data frame structures) and/or at the receiver (e.g., recovering the transmitted signals, demodulating and decoding high-speed data frame structures from the recovered signals, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an onboard or external memory unit.

Although the described exemplary embodiments disclosed herein are directed to various 802.15.4 protocol-related systems and methods for using same, the present invention is not necessarily limited to the example embodiments illustrate herein. For example, various embodiments of a high-speed data modulation system and methodology disclosed herein may be implemented in connection with any proprietary or wireless communication standards where protocol controls limit that data transmission rate. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communication device comprising: a physical (PHY) layer module;
   a media access control (MAC) layer circuit coupled to the PHY layer module and configured to:
   generate a limited acknowledgement (LACK) response that indicates: successful receipt of a data transmission, and to reduce a data rate used to transmit data to the wireless communication device,
   wherein the LACK response is generated when a memory for receiving data is storing a predetermined amount of the data;
   wherein the MAC layer circuit further includes:
   a MAC layer management entity (MLME) that includes:
   a discovery request primitive to determine data rates supported by a target PHY layer module;
   a discovery indication primitive to indicate the data rates supported by the target PHY layer module; and
   a discovery confirm primitive to indicate a result of a discovery request.

2. The wireless communication device of claim 1 wherein the MAC layer circuit is further configured to:
   generate an acknowledgement (ACK) response that indicates:
   successful receipt of a data transmission, and
   to increase the data rate used to transmit data to the wireless communication device.

3. The wireless communication device of claim 2 further comprising:
   a neighbor table that includes data rates supported by the PHY layer module;
   a last data rate used; and
   a counter value used to adjust a data rate to be used.

4. The wireless communication device of claim 3 wherein the MAC layer circuit includes:
   a LACK threshold value that indicates the highest data rate to be used.

5. The wireless communication device of claim 4 wherein the MAC layer circuit includes:
   an ACK threshold value that indicates the lowest data rate to be used.

6. The wireless communication device of claim 5 wherein:
   the ACK and LACK threshold values are implemented in a personal area network information base in the MAC layer circuit.

7. The wireless communication device of claim 5 wherein:
   the ACK response is generated when a memory for receiving the data is storing less than the predetermined amount of the data.

8. The wireless communication device of claim 1 wherein:
the LACK response is generated by setting an indicator in an ACK response frame.

9. A method of managing data rate in a wireless communication device comprising:
receiving a request to indicate a PHY mode of the wireless communication device;
sending a response indicating the PHY mode of the wireless communication device;
transmitting a limit acknowledgement (LACK) response after receiving a data frame while within a specified threshold of a buffer capacity limit, wherein the LACK response indicates that the data frame was successfully received, that memory capacity is low, and that a receiver of the LACK response should send data to the wireless communication device at a lower data rate.

10. The method of claim 9 further comprising:
transmitting an acknowledgement (ACK) response after receiving a data frame when within a specified threshold below a buffer capacity limit, wherein the ACK response indicates that the data frame was successfully received and that a receiver of the ACK response can send data to the wireless communication device at a higher data rate.

11. The method of claim 10 further comprising:
updating a counter when the LACK response or the ACK response is sent, wherein the counter is related to a data rate to be used when transmitting data to the wireless communication device.

12. The method of claim 11 further comprising:
checking the counter against a LACK threshold and an ACK threshold to determine whether to lower or raise a data rate being used to transmit data to the wireless communication device.

13. The method of claim 9 further comprising using a reserved bit in an acknowledgement frame of a wireless communication protocol for a personal area network to send the LACK response.

14. The method of claim 13 wherein the wireless communication protocol is an 802.15.4 wireless communication protocol.

15. The method of claim 9 further comprising:
updating a neighbor table with the PHY mode for the wireless communication device when the PHY mode is received from the wireless communication device.

16. The method of claim 15 wherein the PHY mode indicates a data rate and/or a frame size for the wireless communication device.

17. The method of claim 9 further comprising:
sending a response from an initiator MAC layer module to an initiator network layer module indicating the PHY mode of the wireless communication device; and
sending a confirm response from a MAC layer module to a network layer module after a specified duration of time expires.

18. The method of claim 9 wherein the response indicating the PHY mode of the wireless communication device includes data rates supported by the wireless communication device.

* * * * *